(12) United States Patent
Yadav

(10) Patent No.: US 8,595,239 B1
(45) Date of Patent: Nov. 26, 2013

(54) MINIMALLY DISRUPTIVE HASH TABLE

(75) Inventor: Navindra Yadav, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,503

(22) Filed: Jan. 3, 2012

(51) Int. Cl.
  *G06F 12/00* (2006.01)
  *G06F 12/14* (2006.01)
(52) U.S. Cl.
  USPC .............................. 707/747; 726/22; 711/216
(58) Field of Classification Search
  USPC .................. 707/747, 705, 741; 711/200, 216
  See application file for complete search history.

(56) References Cited

U.S. PATENT DOCUMENTS

| | | | |
|---|---|---|---|
| 6,438,652 | B1 | 8/2002 | Jordan et al. |
| 6,980,550 | B1 | 12/2005 | Yip et al. |
| 7,340,532 | B2 | 3/2008 | Swildens |
| 7,610,485 | B1 | 10/2009 | Yadav |
| 7,734,814 | B2 | 6/2010 | Swildens |
| 8,248,928 | B1 | 8/2012 | Wang et al. |
| 2002/0026560 | A1 | 2/2002 | Jordan et al. |
| 2003/0195919 | A1 | 10/2003 | Watanuki et al. |
| 2003/0217096 | A1 | 11/2003 | McKelvie et al. |
| 2004/0197079 | A1 | 10/2004 | Latvala et al. |
| 2006/0075489 | A1* | 4/2006 | Ganguly et al. ............... 726/22 |
| 2008/0021908 | A1* | 1/2008 | Trask et al. .................. 707/100 |
| 2008/0263316 | A1* | 10/2008 | Ross ............................. 711/216 |
| 2010/0251008 | A1 | 9/2010 | Swildens |
| 2010/0322250 | A1 | 12/2010 | Shetty et al. |
| 2011/0283082 | A1* | 11/2011 | McKenney et al. ........... 711/202 |
| 2012/0143876 | A1* | 6/2012 | Srinivasan et al. ............ 707/747 |

OTHER PUBLICATIONS

Cryptographic hash function—Wikipedia. http://en.wikipedia.org/wiki/Cryptographic_hash_function; dated Jan. 3, 2012.
Hash function—Wikipedia. http://en.wikipedia.org/wiki/Hash_function; dated Jan. 3, 2012.
Notice of Allowance dated Apr. 12, 2013, issued in USPTO U.S. Appl. No. 13/342,493 filed Jan. 3, 2012 (13 pages).
Notice of Allowance dated May 9, 2013, issued in USPTO U.S. Appl. No. 13/342,503 filed Jan. 3, 2012 (16 pages).
Office Action dated Dec. 17, 2012, issued in USPTO U.S. Appl. No. 13/342,503 filed Jan. 3, 2012 (26 pages).
Pending U.S Appl. No. 13/342,503 filed Jan. 3, 2012.

* cited by examiner

*Primary Examiner* — Shyue Jiunn Hwa
(74) *Attorney, Agent, or Firm* — Young Basile Hanlon & McFarlane P.C.

(57) ABSTRACT

Methods and articles of manufacture relating to hash tables and in particular to minimally disruptive hash tables are disclosed. In one aspect, the method includes creating the hash table with a plurality of hash table buckets, wherein a count of the plurality of hash table buckets is greater than or equal to a maximum count of elements to be stored in the hash table over a period in which the hash table is used, storing a plurality of elements in the plurality of hash table buckets such that each hash table bucket has one of the plurality of elements, and adding a new element to the hash table. Adding the new element includes determining, using a hash function, a plurality of hash table indexes and inserting the new element in the identified hash table buckets by replacing existing elements stored in the hash table buckets.

22 Claims, 10 Drawing Sheets

MINIMALLY DISRUPTIVE HASH TABLE

TECHNICAL FIELD

The present invention relates in general to hash tables and in particular to minimally disruptive hash tables.

BACKGROUND

Generally speaking, hash tables are data structures used by computing devices to store elements of data. In one example, hash tables store elements in hash table buckets. Elements are stored in the hash table buckets and are accessed and inserted using a hash function. A hash function takes as input in one example a key associated with a particular element. The output of the hash function is a hash table index associated with a hash table bucket. The hash table index can be used to identify which hash table bucket to read an element from or insert an element into.

SUMMARY

Disclosed herein are embodiments of methods, apparatuses, and systems relating to hash tables and in particular to minimally disruptive hash tables.

One aspect of the disclosed embodiments is a method for storing elements in a hash table. The method includes creating the hash table in at least one memory, the hash table having a plurality of hash table buckets, wherein a count of the plurality of hash table buckets is greater than or equal to a maximum count of elements to be stored in the hash table over a period in which the hash table is used, storing a plurality of elements in the plurality of hash table buckets such that each hash table bucket has one of the plurality of elements, and adding a new element to the hash table with a processor. Adding the new element includes determining, using a hash function, a plurality of hash table indexes identifying at least some of the hash table buckets in which the new element will be inserted and inserting the new element in the identified hash table buckets by replacing existing elements stored in the hash table buckets.

Another aspect of the disclosed embodiments is an article of manufacture. The article of manufacture includes at least one non-transitory computer-readable medium having stored thereon a hash table data structure, a plurality of hash table buckets included within the hash table data structure, wherein a count of the plurality of hash table buckets is greater than or equal to a maximum count of elements to be stored in the hash table data structure over a period in which the hash table data structure is used, and a plurality of elements stored in the plurality of hash table buckets so that each of the plurality of hash table buckets has one of the plurality of elements, wherein the hash table data structure is capable of storing one or more new elements in the plurality of hash table buckets without refactoring the hash table data structure.

Another aspect of the disclosed embodiments is a method that includes identifying a hash table data structure defined above that is stored in a non-transitory memory and performing an operation on the hash table data structure using a processor without refactoring the hash table data structure, wherein the operation is one of add, remove, or replace.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Hash tables have various uses in computing systems. In one exemplary use, a hash table is utilized to associate a key value to an element stored in a hash bucket in the hash table. For example, this association can be used in networking routers and switches for routing packets in a network. In many such applications, it is desirable for a particular key to remain associated with the same element after the initial association.

In typical hash tables, a particular key does not always remain associated with the same hash bucket. In order to map a key value to a hash bucket, a hash function is used. The hash function is configured to have a number of output values equal to the number of hash buckets included in the hash table so that any possible key value can be associated with a hash bucket using the hash function. In the case where the hash table is refactored (i.e. the number of hash buckets change), a significant number of associations between hash buckets and key values will change. The change is because the hash function will have to be adjusted so that the total possible outputs of the hash function will be equal to the new number of hash buckets in the hash table.

Described herein is a minimally disruptive hash table where changing a number of elements stored within the hash table does not require refactoring the hash table. A minimally disruptive hash table is created with a number of hash buckets greater than or equal to a maximum expected count of elements to be stored in the hash table over a period in which the hash table is used. The maximum expected count can be application dependent and, for example, can be determined automatically when the hash table is created or can be predetermined. Elements added to the hash table are distributed throughout the available hash buckets. The distribution of elements within the hash table can be equally or unequally weighted. For example, if equally weighted, each element will be targeted to occupy an equal number of hash buckets. As another example, if unequally weighted, each element can have an associated weight that controls a number of hash buckets that each element is targeted to occupy.

Figure 1:
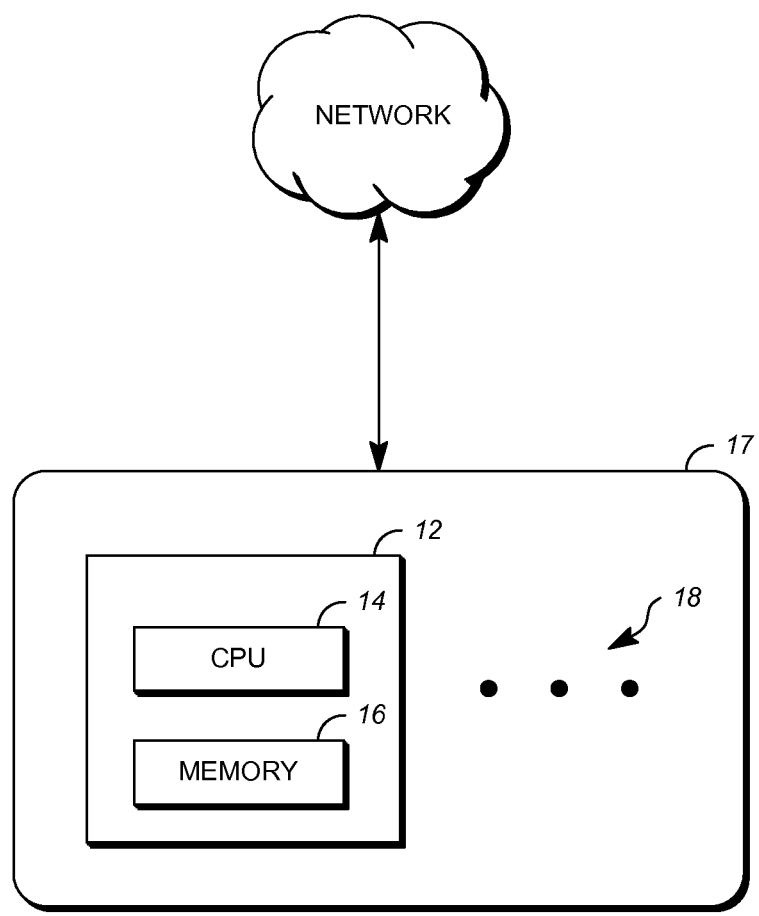
FIG. 1 is a diagram of a computing scheme according to embodiments of the disclosed subject matter.

FIG. 1 is a diagram of a computing scheme 10 according to embodiments of the disclosed subject matter. An exemplary computing device 12 can be, for example, a computer having an internal configuration of hardware including a processor such as a central processing unit (CPU) 14 and a memory 16. CPU 14 can be a controller for controlling the operations of computing device 12. The CPU 14 is connected to memory 16 by, for example, a memory bus. Memory 16 can include random access memory (RAM) or any other suitable memory device. Memory 16 can store data and program instructions which are used by the CPU 14. Computing device 12 can also take other forms, such as network routers or switches. Other suitable implementations of computing device 12 are possible.

The computing device 12 can be the only computing device or can be one of a group of computing devices 17 that includes additional computing devices 18. The group of computing devices 17 can be implemented as a computing cluster whereby the computing device 12 and additional computing devices 18 share resources, such as storage memory, and load-balance the processing of requests to the computing device. The group of computing devices 17 can alternatively be a cloud computing service. For example, a cloud computing service can include hundreds or thousands of computing devices configured to provide scalable computing resources. In a cloud computing service, computing tasks can be performed on one or more computing devices or other computing devices included within the cloud computing service.

The above are only exemplary implementations of the group of computing devices 17, and any distributed computing model can be used in their place. As used herein, the term computing device is understood to include any combination or implementation of computing devices, computing device groups, or any other configuration of computing devices.

Other implementations of the computing scheme 10 are possible, and components can be added, removed, modified, or replaced in various implementations. In one exemplary implementation, the group of computing devices 17 and additional computing devices 18 are omitted and a single computing device 12 is used. In another exemplary implementation, single computing device 12 and/or additional computing devices 18 include one or more network ports operable to connect device 12 and devices 18 to one or more networks (such as a local area network (LAN), wide area network (WAN), or the Internet) and/or other devices.

Although FIG. 1 depicts that processor 14 and memory 16 are integrated into single units, this depiction is exemplary only. The operations of computing device 12 and/or additional computing devices 18 can be distributed across multiple processors on the same machine or different machines or across a network such as a local area network, wide area network or the Internet and the term "computing device" can encompass such multi-machine systems. Memory 16 can also be integral units (such as the RAM within a computer) or can be distributed across multiple machines such as a network-based memory or memory in multiple machines performing the operations of computing device 12 and/or additional computing devices 18.

Figure 2A:
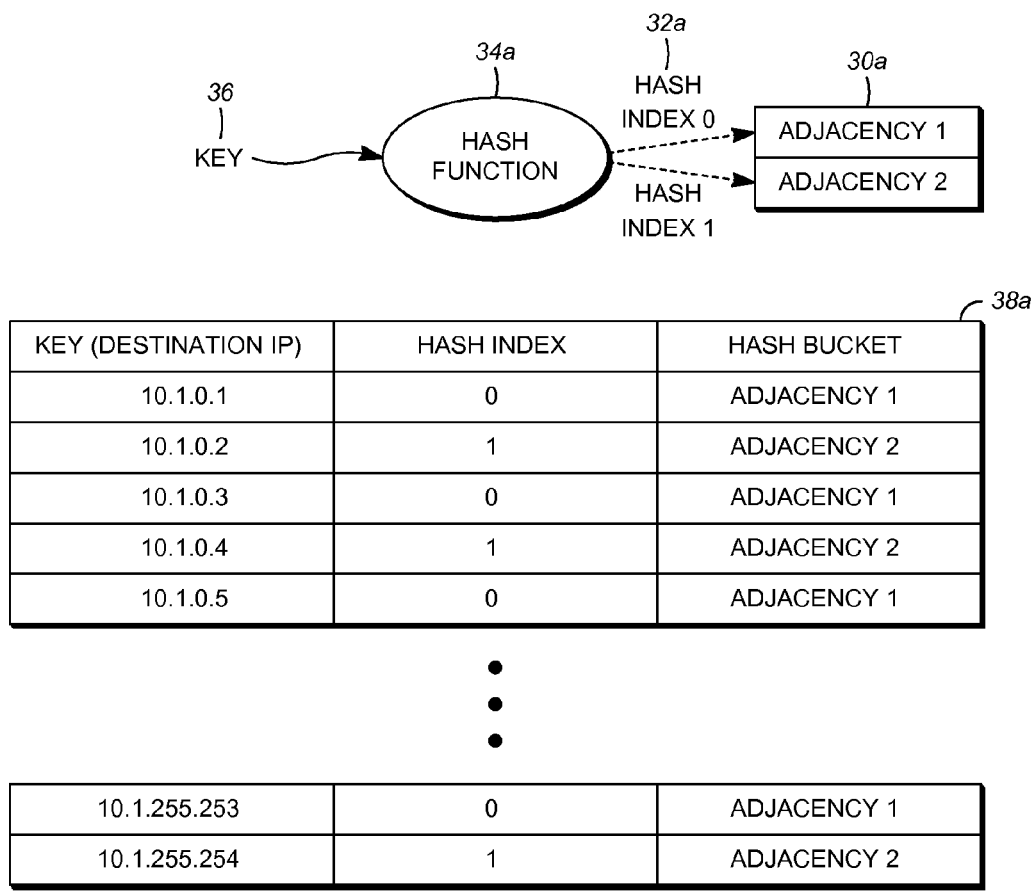
FIGS. 2A and 2B are block diagrams of one exemplary hash table that requires refactoring when elements are added or removed.
Figure 2B:
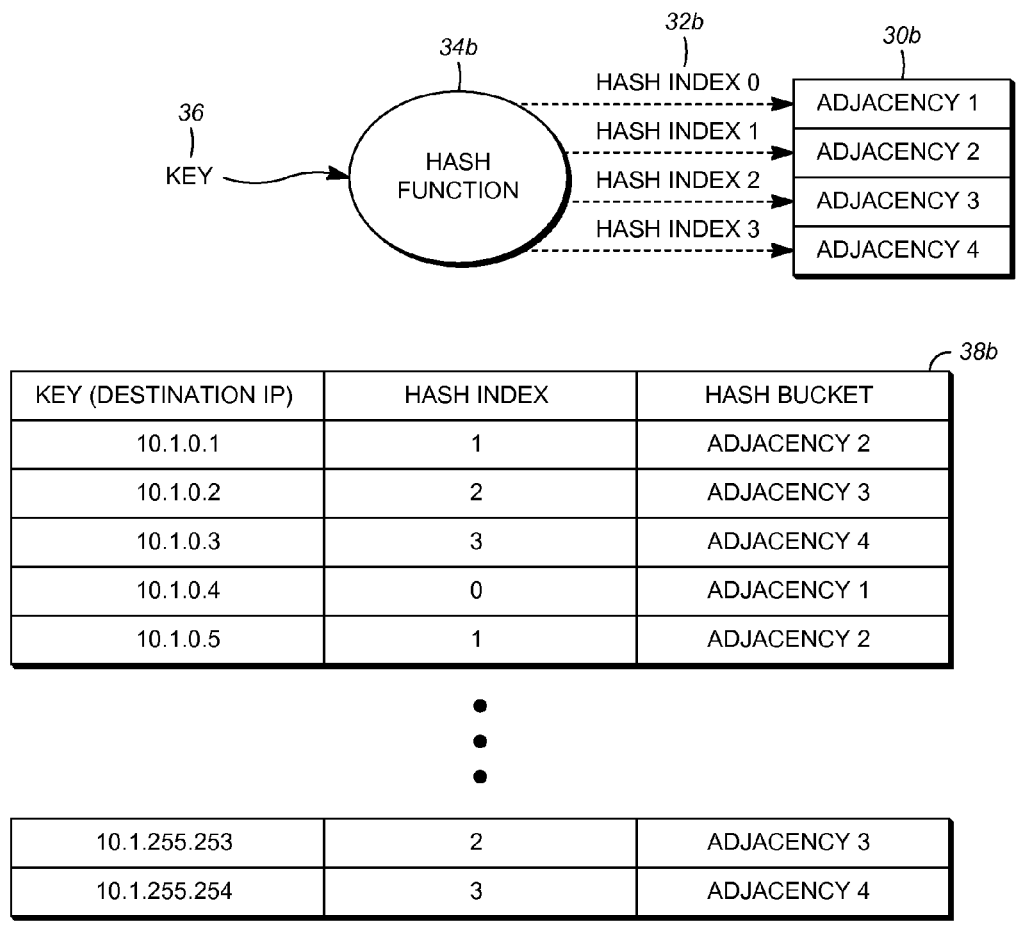

FIGS. 2A and 2B are block diagrams of one exemplary hash table that requires refactoring when elements are added or removed according to embodiments of the disclosed subject matter. FIGS. 2A and 2B depict a hash table used for (Un)Equal Cost Multiple Path (ECMP) IP routing. In an IP network, network packets can sometimes be routed to a destination over a number of different network paths. ECMP IP routing can be used to select a network path for each packet sent through a device by selecting adjacent network connections (i.e. adjacency) to transmit each packet through. Network packets are typically associated with a packet flow, which is, for example, a sequence of packets sent from a source application to a destination application. In a typical ECMP implementation, it is desirable for the transmission of each packet flow to be maintained on a consistent network path to avoid reordering of packets within the packet flow. For example, the performance of some applications and protocols (such as TCP) can be degraded when packets in a flow are reordered.

With respect to FIG. 2A, a hash table 30a is shown having two hash buckets. The hash buckets include elements associated with "Adjacency 1" and "Adjacency 2." The hash buckets of hash table 30a are accessed by way of hash table indexes 32a. In this example, hash table indexes 32a include "Hash table index 0" and "Hash table index 1" which are each associated with one of the hash buckets. A hash function 34a is used to convert a key value 36 to one of the hash table indexes 32a. In this example, the key value 36 is a destination IP address of a packet to be routed using ECMP. However, in other examples, other key values may be used, such as a combination of source and destination IP addresses.

Routing table 38a contains exemplary key values, hash table indexes 32a, and hash bucket elements from hash table 30a associated with the hash table indexes 32a based on hash function 34a. For example, key (destination IP) 10.1.0.1 is associated with hash table index 0 and hash bucket (adjacency) 1, and key (destination IP) 10.1.0.2 is associated with hash table index 1 and hash bucket (adjacency) 2. The remaining keys similarly alternate association with the two hash buckets.

Now with respect to FIG. 2B, a hash table 30b is shown having four hash buckets. Hash table 30b is an example of hash table 30a being refactored (i.e. resized) from two hash buckets to four hash buckets. This can be done, for example, when a number of adjacencies changes. In this example, hash table indexes 32b include in addition to 32a a "Hash table index 2" and "Hash table index 3." Hash table indexes 32b are each associated with one of the hash buckets. A hash function 34b is used to convert a key value 36 to one of the hash table indexes 32b. Hash function 34b can be a modification of hash function 34a configured to produce four output values (hash table indexes) instead of two output values (hash table indexes).

Routing table 38b contains exemplary key values, hash table indexes 32b, and hash bucket elements from hash table 30b associated with the hash table indexes 32b based on hash function 34b. For example, key (destination IP) 10.1.0.1 is now associated with hash table index 1 and hash bucket (adjacency) 2, and key (destination IP) 10.1.0.2 is associated with hash table index 2 and hash bucket (adjacency) 3. The remaining keys alternate association with the four hash buckets now included in hash table 30b.

Notably, in routing table 38b, the adjacency associated with each key (destination IP) has changed because of the refactoring of the hash table. Generally speaking, when a typical hash table is refactored, nearly all key to element associations will be lost. The associations that are maintained (if any) will depend on numerous implementation specific factors, including the size of the hash table, number of hash buckets added or deleted, and the hash function utilized. For example, a hash function having a poor output distribution over the hash buckets may retain more associations than another hash function having a good output distribution.

Figure 3A:
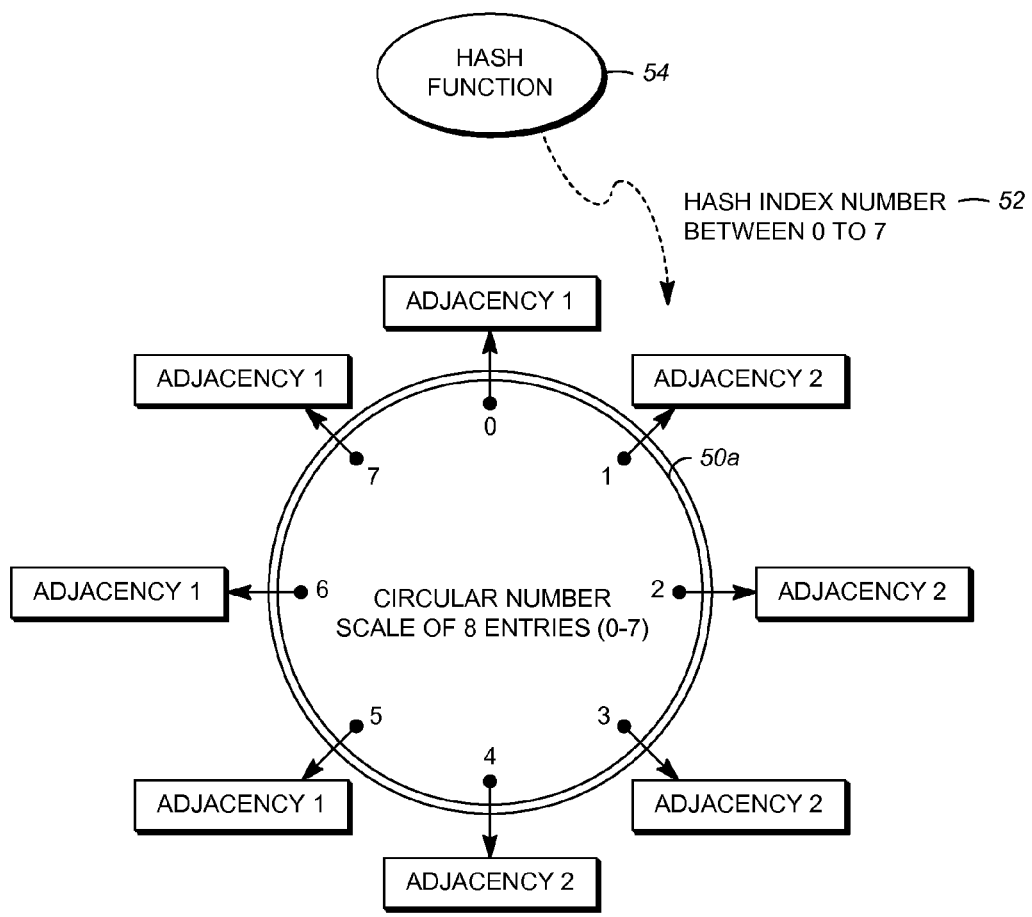
FIGS. 3A and 3B are block diagrams of one exemplary minimally disruptive hash table that does not require refactoring when elements are added or removed according to embodiments of the disclosed subject matter.
Figure 3B:
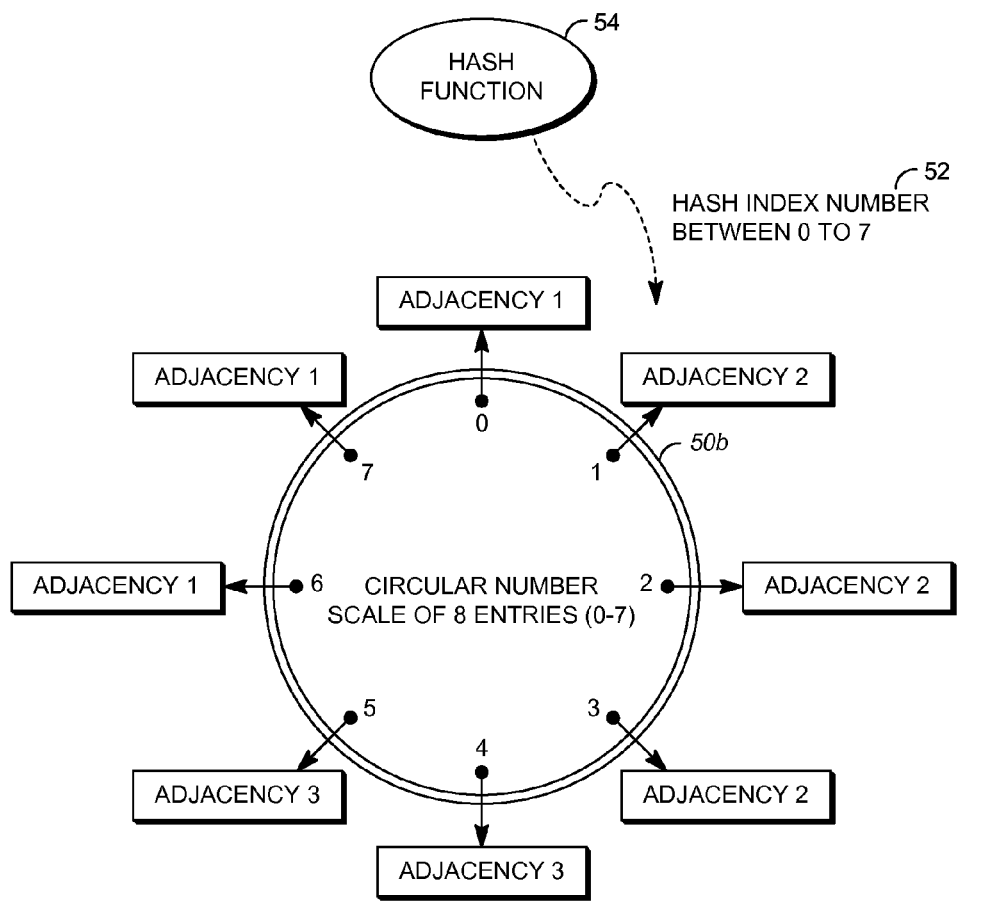

FIGS. 3A and 3B are block diagrams of one exemplary minimally disruptive hash table that does not require refactoring when elements are added or removed according to embodiments of the disclosed subject matter. Similar to FIGS. 2A and 2B, FIGS. 3A and 3B depict a hash table usable for ECMP IP routing. However, unlike FIGS. 2A and 2B, FIGS. 3A and 3B illustrate the use of a minimally disruptive hash table to avoid unnecessary changes in the associations between keys and hash buckets when adding or removing elements from the hash table.

With respect to FIG. 3A, a minimally disruptive hash table 50a is shown having eight hash buckets. The hash buckets include two distinct elements associated with "Adjacency 1" and "Adjacency 2." The two distinct elements are distributed throughout the hash buckets. The hash buckets of minimally disruptive hash table 50a are accessed by way of hash table indexes 52. In this example, hash table indexes 52 include indexes from 0 to 7 which are each associated with one of the hash buckets. A hash function 54 is used to convert a key value 56 to one of the hash table indexes 52. In this example, the key value 56 is a destination IP address of a packet to be routed using ECMP. However, in other examples, other key values may be used, such as a combination of source and destination IP addresses.

The distinct elements included in hash table 50a are distributed throughout the table using techniques such as those described later with respect to FIGS. 5-8. In this example, the "Adjacency 1" element is stored in hash buckets associated with hash table indexes 0 and 5-7. Correspondingly, the "Adjacency 2" element is stored in hash buckets associated with hash table indexes 1-4.

Routing table 58a contains exemplary key values, hash table indexes 52, and hash bucket elements from hash table 50a associated with the hash table indexes 52 based on hash function 54. For example, key (destination IP) 10.1.0.1 is associated with hash table index 0 and hash bucket 0 (adjacency 1), and key (destination IP) 10.1.0.2 is associated with hash table index 1 and hash bucket 1 (adjacency 2). The remaining keys are similarly associated with one of the eight hash buckets and one of the two adjacencies.

Now with respect to FIG. 3B, a minimally disruptive hash table 50b is shown having eight hash buckets, similar to minimally disruptive hash table 50a. Hash table 50b is an illustrative example of adding an element to hash table 50a without refactoring hash table 50a. Techniques for adding an element to a minimally disruptive hash table are described further with respect to FIGS. 5-6.

Similar to hash table 50a, the three distinct elements of hash table 50b are distributed throughout the hash buckets. The hash buckets of minimally disruptive hash table 50b are accessed by way of hash table indexes 52. In this example, hash table indexes 52 include indexes from 0 to 7 which are each associated with one of the hash buckets. A hash function 54 is used to convert a key value 56 to one of the hash table indexes 52.

The distinct elements included in hash table 50a are distributed throughout the table using techniques such as those described later with respect to FIGS. 5-8. In this example, the "Adjacency 1" element is stored in hash buckets associated with hash table indexes 0 and 6-7. The "Adjacency 2" element is stored in hash buckets associated with hash table indexes 1-3.

The new "Adjacency 3" element is stored in hash buckets associated with hash table indexes 4 and 5. Notably (unlike hash tables 30a-b), the addition of the new "Adjacency 3" element only disturbs the key to element associations for the hash buckets in which the new element is added (hash table indexes 4 and 5).

Routing table 58b contains exemplary key values, hash table indexes 52, and hash bucket elements from hash table 50a associated with the hash table indexes 52 based on hash function 54. For example, key (destination IP) 10.1.0.1 is still associated with hash table index 0 and hash bucket 0 (adjacency 1), and key (destination IP) 10.1.0.2 is still associated with hash table index 1 and hash bucket 1 (adjacency 2). The only key to element associations that are changed are those associated with hash table indexes 4 and 5. The remaining key to element associations are maintained.

The number of key to element associations impacted by a change to a minimally disruptive hash table can be expressed mathematically. For example, a number of hash buckets x changed when adding y elements can be expressed using formula 1:

$$x = \sum_{i=e}^{e+y} \begin{cases} \dfrac{N}{e+i}, & i > (N \% (e+i)) \\ \dfrac{N}{e+i} + 1, & i \le (N \% (e+i)) \end{cases} \text{; wherein} \quad (1)$$

e is a number of elements stored in the hash table before adding the y new elements;

% is the modulo operator; and

N is a total number of hash buckets in the hash table.

Figure 4:
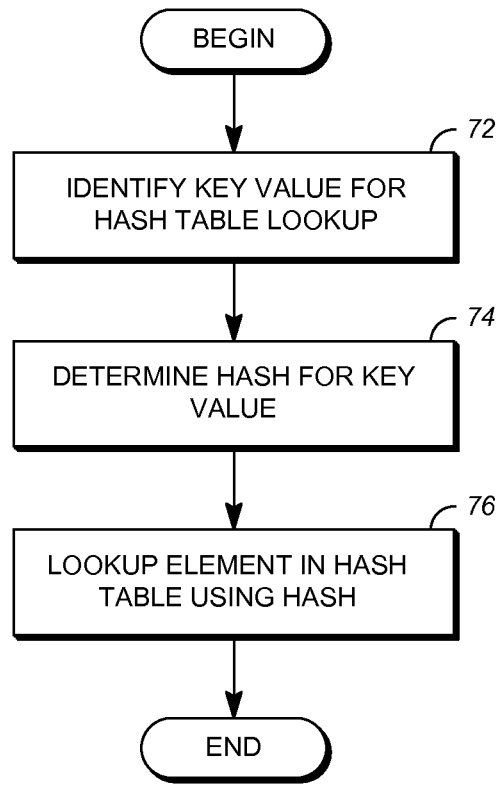
FIG. 4 is a flowchart of a technique of searching for an element in a minimally disruptive hash table according to embodiments of the disclosed subject matter.

FIG. 4 is a flowchart of a technique of searching for an element in a minimally disruptive hash table according to embodiments of the disclosed subject matter. First, at stage 72, a key value is identified for the hash table lookup. For example, in many networking use-cases, the key value can be any value associated with a packet or other piece of data to be associated with an element stored in a minimally disruptive hash table. One exemplary key value is an IP address. However, other values and combinations of values can be used for the key value.

Once the key value is identified, a hash for the key value is determined at stage 74. The hash can be determined using a hash function, such as hash function 54 described earlier. After the hash is determined, it is used to lookup an element from the hash table at stage 76.

Figure 5:
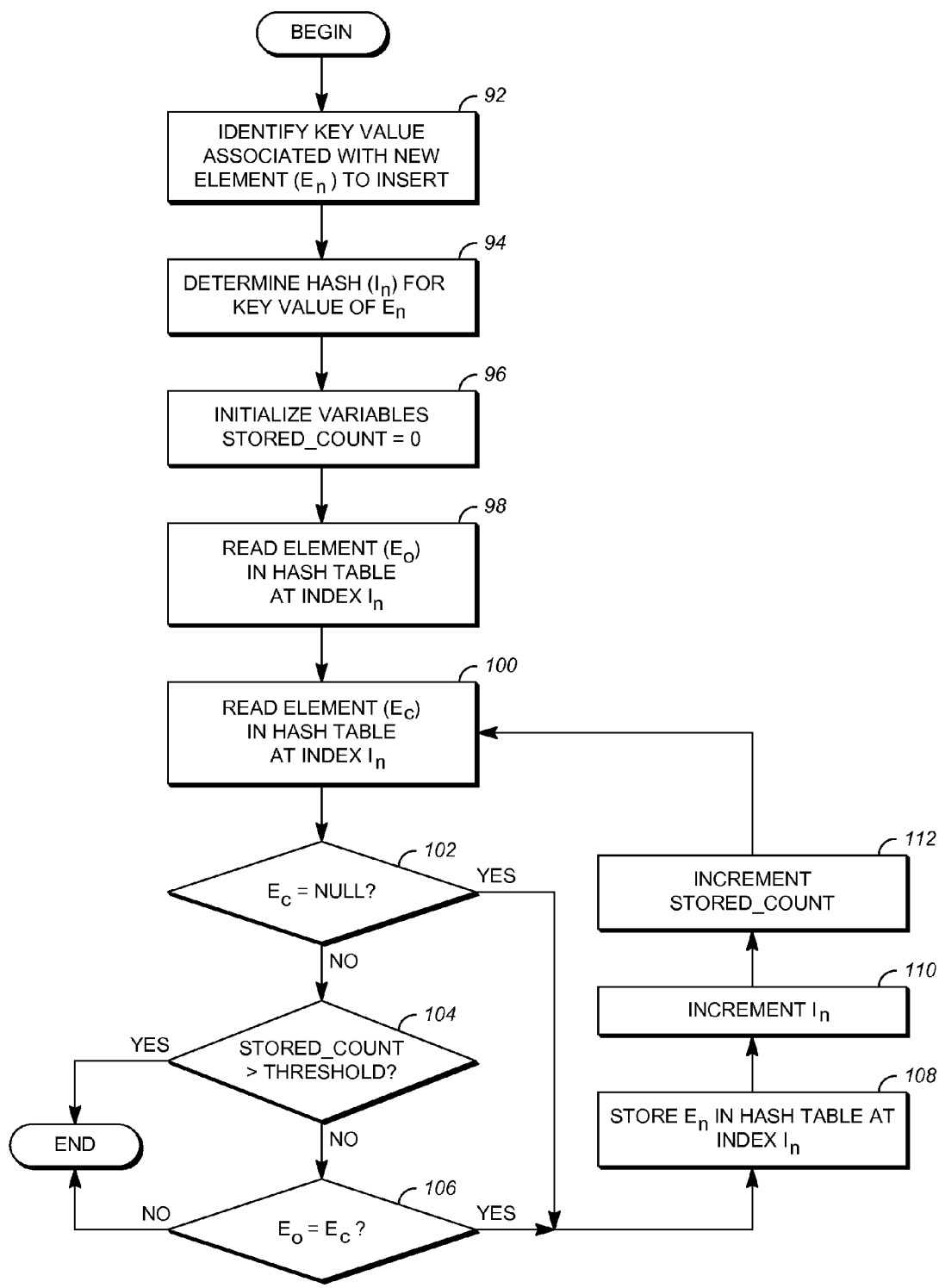
FIG. 5 is a flowchart of one exemplary technique of adding an element to a minimally disruptive hash table according to embodiments of the disclosed subject matter.

FIG. 5 is a flowchart of one exemplary technique 90 of adding an element to a minimally disruptive hash table according to embodiments of the disclosed subject matter. At stage 92, a key value associated with a new element $E_n$ to be inserted is identified. Similar to the search techniques described above, the key value can be any value associated with the new element $E_n$ or any combination of values. For example, with respect to FIG. 3A above, the key value for an adjacency could be the index number of that adjacency (i.e. 1 or 2).

Next, a hash $I_n$ is determined at stage 94 for the identified key value. Hash $I_n$ can be determined using any hash function. At stage 96, variables needed for technique 90 are initialized. For example, the variable STORED_COUNT can be initialized to zero. The variable STORED_COUNT represents a total count of hash table indexes associated with hash buckets in which the new element $E_n$ is inserted.

At stage 98, an original element $E_n$ is read from the hash table from hash table index $I_n$. At stage 100, element $E_c$ is read from the hash table from hash table index $I_n$. $E_n$ is maintained throughout technique 90 as an indication of the first element replaced in the hash table. $E_c$ is updated in each iteration of technique 90 as $E_n$ is inserted in hash buckets of the hash table and as $I_n$ is incremented.

At stage 102, $E_c$ is tested to see if it is NULL (or has a similar property, such as being empty). If $E_c$ is NULL, control passes to stage 108, which is described later. If $E_c$ is not NULL, control passes to stage 104, where STORED_COUNT is compared to a threshold. The threshold controls how many hash buckets into which the new element $E_n$ is inserted.

The threshold can be determined in a number of different ways. For example, the threshold can be calculated so that each element in the hash table preferably occupies an equal number of hash buckets. In this case, the threshold $T_{E_i}$ for an element $E_i$ can be determined by dividing the total number of hash buckets in the hash table (N) by the number of elements stored in the hash table (e). In an alternate implementation, the threshold can be determined using a weight $w_i$. With a weight, each element can be targeted to occupy a different proportion of the hash buckets of the hash table. In one example of the alternative implementation, the threshold can be calculated as follows:

$$T_{E_i} = \begin{cases} \frac{w_i}{\Sigma w}, & i \geq (N \% e) \\ \frac{w_i}{\Sigma w} + 1, & i < (N \% e) \end{cases} \quad ; \text{wherein} \quad (2)$$

$\Sigma w$ is the sum of the weights of all of the elements stored in the hash table.

If the STORED_COUNT is not greater than the threshold, $E_o$ and $E_c$ are compared at stage 106. If $E_o$ and $E_c$ are the same element, control passes to stage 108. At stage 108, $E_n$ is stored in the hash table at hash table index $I_n$. Next, at stage 110, $I_n$ is incremented. Incrementing can mean any change in $I_n$ that points the incremented $I_n$ to the next hash bucket in the hash table. For example, the incrementing can include a modulus operation that loops the value $I_n$ back to the first hash table index of the hash table once the last hash bucket of the hash table is reached. Once $I_n$ is incremented, STORED_COUNT is incremented at stage 112. Control then passes back to stage 100.

Execution of stages 100 through 112 of technique 90 continues as described to determine additional hash table indexes identifying hash table buckets in which the new element $E_n$ is to be added/inserted and to insert $E_n$ into those hash table buckets. Technique 90 completes when the STORED_COUNT is greater than the threshold at stage 106 or if $E_o$ and $E_c$ are not the same element at stage 108.

Figure 6:
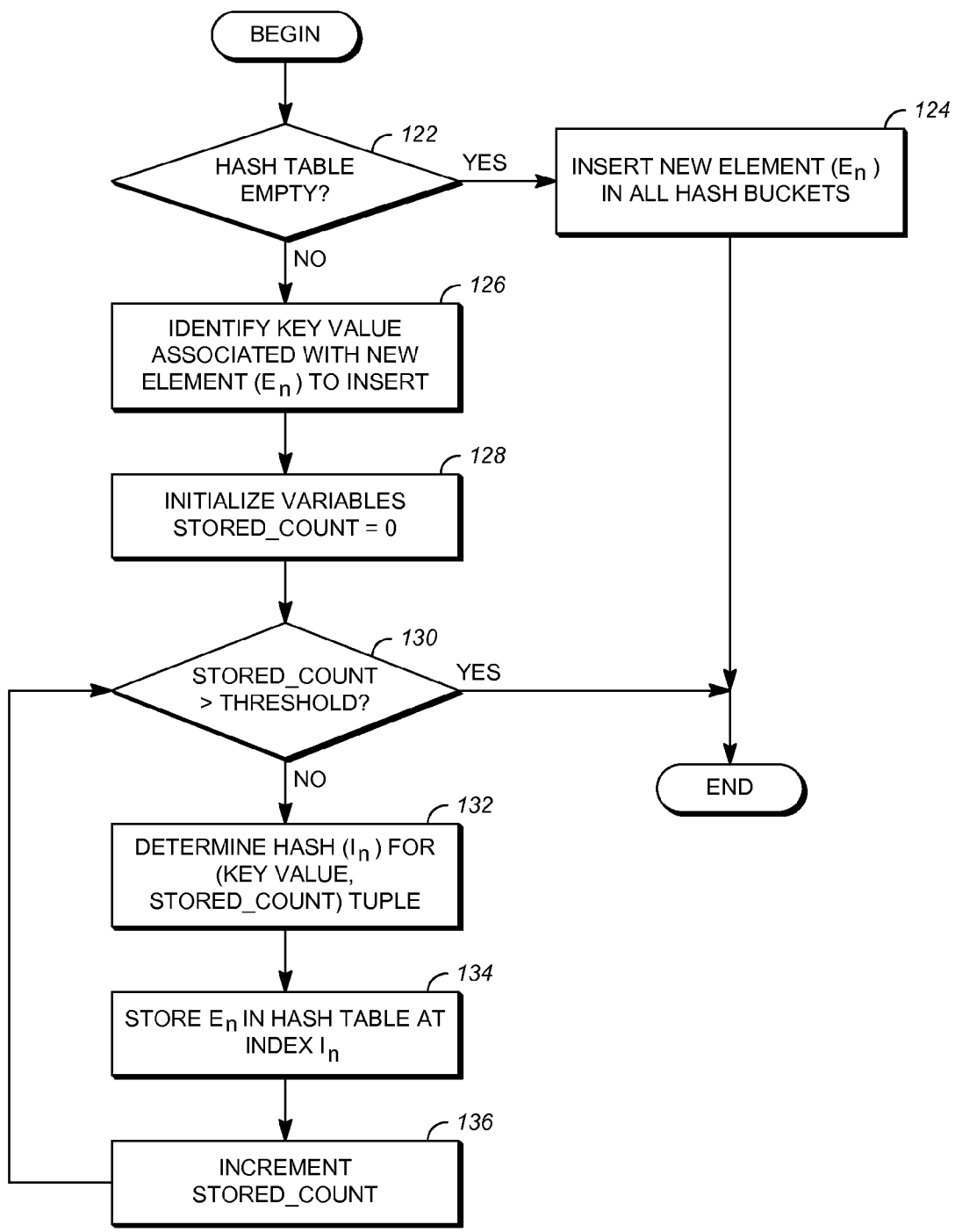
FIG. 6 is a flowchart of another exemplary technique of adding an element to a minimally disruptive hash table according to embodiments of the disclosed subject matter.

FIG. 6 is a flowchart of another exemplary technique 120 of adding an element to a minimally disruptive hash table according to embodiments of the disclosed subject matter. At stage 122, the hash table is checked to see if it is empty. If it is empty, control passes to stage 124, where a new element $E_n$ is inserted into all hash buckets of the hash table. Technique 120 is then completed.

Referring back to stage 122, if the hash table is not empty, control instead passes to stage 126, where a key value associated with the new element $E_n$ to be inserted is identified. Similar to the techniques described above, the key value can be any value associated with the new element $E_n$ or any combination of values. For example, with respect to FIG. 3A above, the key value for an adjacency could be the index number of that adjacency (i.e. 1 or 2).

At stage 128, variables needed for technique 90 are initialized. For example, the variable STORED_COUNT can be initialized to zero. The variable STORED_COUNT tracks the number of hash buckets in which the new element $E_n$ is inserted. Next, STORED_COUNT is compared to a threshold at stage 130. The threshold controls how many hash buckets into which the new element $E_n$ is inserted. The threshold can be determined as previously described with respect to technique 90.

If the STORED_COUNT is less than the threshold, control passes to stage 132, where a hash $I_n$ is determined for a (key value, STORED_COUNT) tuple. STORED_COUNT is added to the input of the hash function in order to distribute entries of the new element $E_n$ throughout the hash table. Next, at stage 134, $E_n$ is stored in a hash bucket of the hash table associated with hash table index $I_n$. At stage 136, STORED_COUNT is incremented. Then, control returns to stage 130. With respect to stage 130, once the STORED_COUNT is greater than the threshold, technique 120 completes.

Techniques 90 and 120 as described and shown are only two possible implementations of adding elements to a minimally disruptive hash table. Other techniques are possible, including those that add, remove, modify, or replace stages of techniques 90 and 120. For example, in an alternative implementation, stage 106 of technique 90 can be omitted. In another alternative implementation, stages 122 and 124 of technique 120 can be omitted.

Figure 7:
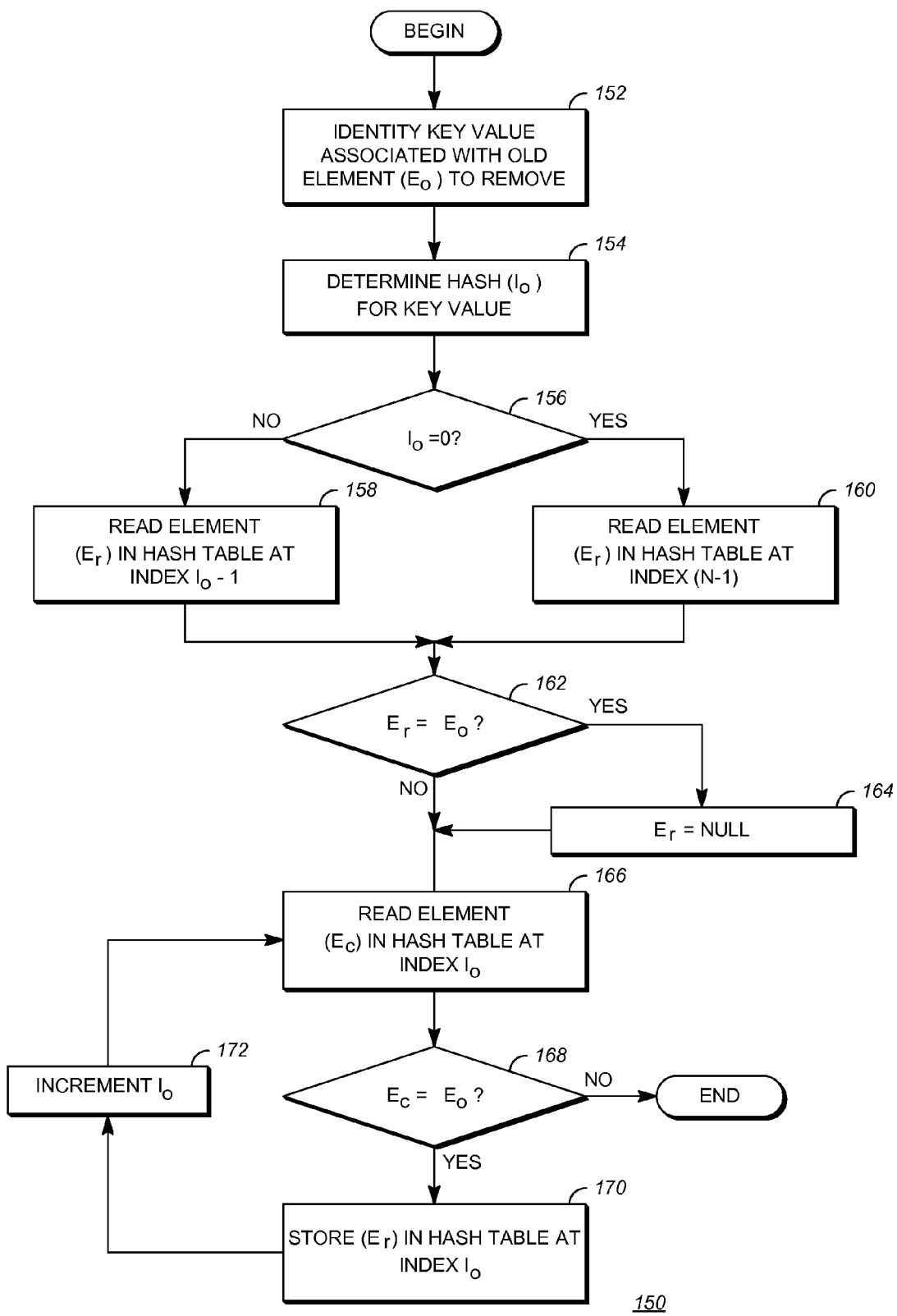
FIG. 7 is a flowchart of one exemplary technique of removing an element from a minimally disruptive hash table according to embodiments of the disclosed subject matter.

FIG. 7 is a flowchart of one exemplary technique 150 of removing an element from a minimally disruptive hash table according to embodiments of the disclosed subject matter. Technique 150 generally can be used with a hash table that uses technique 90 for adding elements.

At stage 152, a key value associated with the old element $E_o$ to be removed is identified. Similar to the techniques described above, the key value can be any value associated with the old element $E_o$ or any combination of values. For example, with respect to FIG. 3A above, the key value for an adjacency could be the index number of that adjacency (i.e. 1 or 2).

Next, a hash $I_o$ is determined at stage 154 for the identified key value. Hash $I_o$ can be determined using any hash function. At stage 156, $I_o$ is compared to zero. If $I_o$ is not zero, control passes to stage 158, where replacement element $E_n$ is read from the hash bucket corresponding to hash table index $I_o$–1. Otherwise, if $I_o$ is zero, control passes to stage 160, where replacement element $E_n$ is read from the hash bucket corresponding to hash table index N–1. In other words, the replacement element $E_r$ corresponds to the element stored before the element to be removed $E_o$ in the hash table.

Next, at stage 162, $E_r$ is compared to $E_o$. If they are equal, $E_r$ is set to NULL (or other indication of an empty value) at stage 164. If they are not equal control passes directly to stage 166. At stage 166, current element $E_c$ is read from the hash bucket corresponding to hash table index $I_o$. Next, at stage 168, $E_c$ is compared to $E_o$. If they are equal, control passes to stage 170, where $E_n$ is stored in the hash table in the hash bucket corresponding to hash table index $I_o$. Next, at stage 172, hash table index $I_o$ is incremented. As described above with respect to $I_n$, the incrementing of $I_o$ can include a modulus operation so that when $I_o$ reaches the end of the hash table, the next value of $I_o$ will correspond to the beginning of the hash table.

Control then passes back to stage 166. Stages 166 through 172 are performed iteratively until $E_c$ does not equal $E_n$ at stage 168, at which point technique 150 completes.

Figure 8:
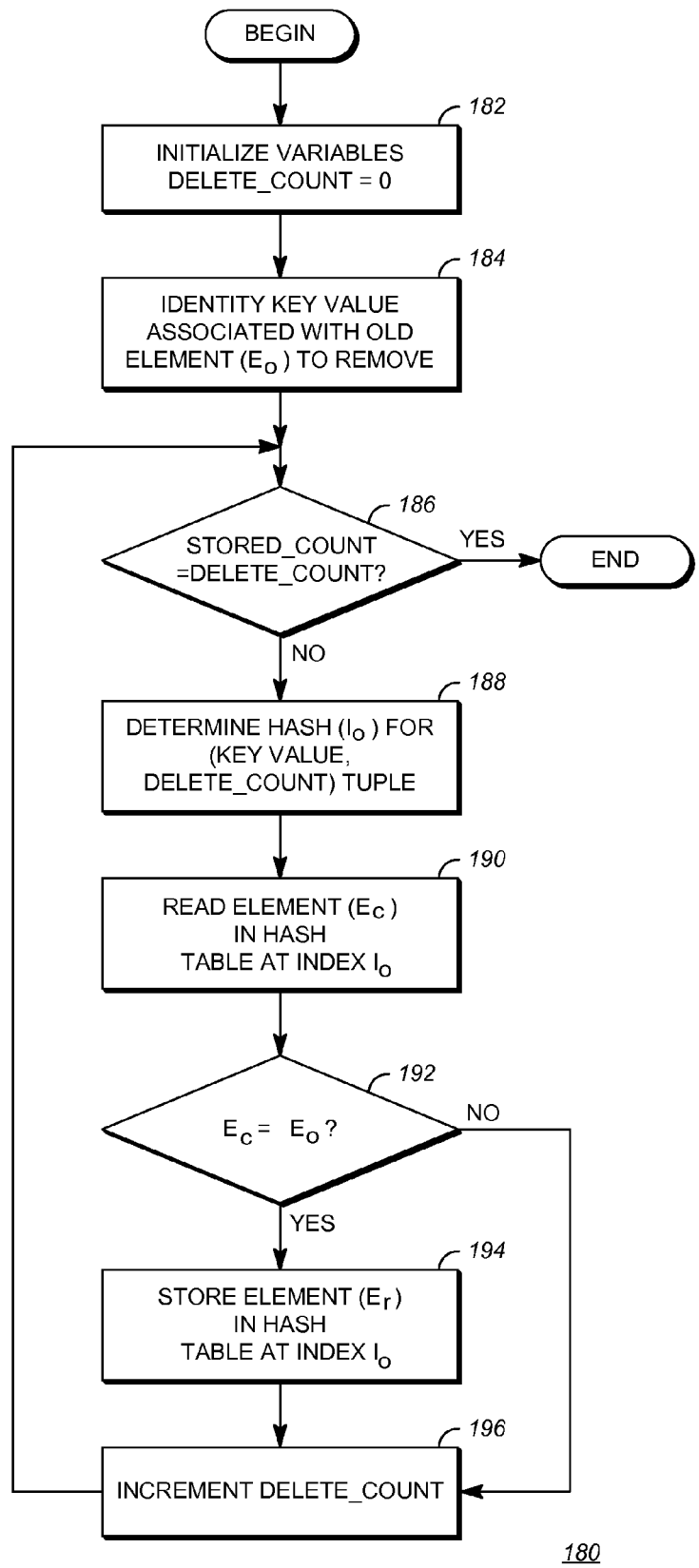
FIG. 8 is a flowchart of another exemplary technique of removing an element from a minimally disruptive hash table according to embodiments of the disclosed subject matter.

FIG. 8 is a flowchart of another exemplary technique 180 of removing an element from a minimally disruptive hash table according to embodiments of the disclosed subject matter. Technique 180 generally can be used with a hash table that uses technique 120 for adding elements. At stage 182, variables needed for technique 90 are initialized. For example, the variable DELETE_COUNT can be initialized to zero. The variable DELETE_COUNT tracks the number of hash buckets from which the old element $E_n$ is removed.

At stage 184, a key value associated with the old element $E_n$ to be removed is identified. Similar to the techniques described above, the key value can be any value associated with the new element $E_n$ or any combination of values. For example, with respect to FIG. 3A above, the key value for an adjacency could be the index number of that adjacency (i.e. 1 or 2).

At stage 186, STORED_COUNT is compared to DELETE_COUNT. STORED_COUNT can be an input to technique 180 and is an indication of a number of hash buckets in which $E_n$ is stored. STORED_COUNT can be determined from values stored in memory that indicate a number of hash buckets that each element of the hash table occupies. For example, the values stored in memory can be updated on each add and remove operation on the hash table. In an alternative implementation, the STORED_COUNT of an element can be determined on demand when a remove operation is to be performed.

If STORED_COUNT is not equal to DELETE_COUNT, control passes to stage 188. At stage 188, a hash $I_o$ is determined for a (key value, DELETE_COUNT) tuple. DELETE_COUNT is added to the input of the hash function in order to find the entries of the element $E_n$ that were stored throughout the hash table when $E_o$ was added to the hash table (for example, by use of technique 90).

Next, at stage 190, current element $E_c$ is read from the hash bucket associated with hash table index $I_o$. At stage 192, $E_c$ is compared to $E_o$. If $E_c$ is equal to $E_o$, control passes to stage 194. Otherwise, stage 194 is skipped and control passes to stage 196. At stage 194, replacement element $E_r$ is stored in the hash table in a hash bucket associated with index $I_o$.

Replacement element $E_r$ can be an input to technique 180. In one example, the replacement element $E_r$ can be selected based on a loading of the hash table. In this case, loading means a comparison between a number of hash table buckets in which a given element is stored in the hash table as compared to an ideal number of buckets that the given element would ideally be stored in based on a total number of hash table buckets and the weight associated with the given element. When selecting the replacement element $E_r$ based on loading, the element stored in the hash table having the lowest loading (i.e. greatest deficiency in number of actual hash table buckets versus ideal number of hash table buckets) will be selected.

Next, at stage 196, DELETE_COUNT is incremented. Control then returns to stage 186. Technique 180 continues until STORED_COUNT is equal to DELETE_COUNT at stage 186, at which point technique 180 completes.

Exemplary hash functions usable within the techniques herein (including hash function 54) can include primitive polynomials such as cyclic redundancy check (CRC) functions or cryptographic functions such as MD5 functions. Specific functions include but are not limited to modulo, pseudo modulo, XOR, folded XOR, CRC4, CRC8, CRC16, CRC24, CRC32, MD5, Elliptic Curve Signing, SHA1, and SHA256. Suitable hash functions include those providing good distribution across all of the hash table buckets, those having uncorrelated distributions, fast execution times, and small memory requirements. However, any hash function can be utilized.

In one alternative implementation, a transformed hash function can be used to reduce the number of hash table buckets actually stored in memory. For example, a hash table can be created with $2^{32}$ (4,294,967,295) hash table buckets. Such a hash table could utilize a CRC32 (32 bit CRC) hash function to generate hash table indexes associated with the hash table buckets. If only a relatively small number of elements are to be stored in the hash table at a given time, it can be advantageous to store only a portion of the hash table buckets in physical memory in order to improve processing efficiency and to reduce memory utilization.

In this instance, the hash function can be transformed so that the range of the hash function output is reduced to cover only a portion of the hash table buckets. For example, the output of the hash function can be truncated. In one implementation, the output function can be truncated to 8 bits. In one example, the most significant 24 bits of the hash function output are set to zero (discarded). In this case only $2^8$ hash table buckets would be stored in memory. In this case, the hash table still logically has $2^{32}$ hash table buckets, just $2^{24}$ of those hash table buckets would not be stored in memory and the key values that would normally be associated with those non-stored hash table buckets instead are associated with (redirected to) stored hash table buckets.

In order to increase the number of hash table buckets stored in memory, the transformation is changed so that the range of the transformed hash function output is increased. The change in transformation maintains the association between key values and stored elements. In an extension of the implementation described above, the truncation of the output function could be changed to 9 bits instead of 8 bits. In this case, $2^9$ hash table buckets would be now stored in memory. The additional hash table buckets stored in memory are interleaved with the previously stored hash table buckets, with each additional hash table bucket being associated with one previously stored hash table bucket. The additional hash table buckets are initialized with an element by copying the element stored in the previously stored hash table bucket associated with each additional hash table bucket. Accordingly, the change in the number of hash table buckets stored in memory does not affect the key value to element associations of the hash table.

The examples described above of transforming the hash function and reducing the number of hash table buckets stored in memory is only one implementation of these techniques. Other implementations are also available. For example, in other implementations, different transformation functions can be utilized instead of truncation and different hash functions can be used instead of CRC.

The embodiments of computing device 12 and/or computing devices 17 (and the algorithms, techniques, instructions etc. stored thereon and/or executed thereby) can be realized in hardware including, for example, computers, IP cores, application-specific integrated circuits (ASICs), programmable logic arrays, optical processors, programmable logic controllers, microcode, firmware, microcontrollers, computing devices, microprocessors, digital signal processors or any other suitable circuit. As used herein, the term "processor" should be understood as encompassing any the foregoing hardware, either singly or in combination. The terms "signal" and "data" are used interchangeably. Further, portions of computing device 12 and/or computing devices 17 do not necessarily have to be implemented in the same manner.

Further, in one example, computing device 12 and/or computing devices 17 can be implemented using a general purpose computer/processor with a computer program that, when executed, carries out any of the respective techniques, algorithms and/or instructions described herein. In addition or alternatively, for example, a special purpose computer/processor can be utilized which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The exemplary approaches herein have been described in order to allow easy understanding of the disclosed subject matter and do not limit the disclosed subject matter. On the contrary, the disclosed subject matter is intended to cover various modifications and equivalent arrangements included within the scope of the appended claims, which scope is to be accorded the broadest interpretation so as to encompass all such modifications and equivalent structure as is permitted under the law.

What is claimed is:

1. A method for storing elements in a hash table comprising:
    creating the hash table in at least one non-transitory memory, the hash table having a plurality of hash table buckets such that a count of the plurality of hash table buckets is greater than or equal to a maximum count of elements to be stored in the hash table over a period in which the hash table is used;
    storing a plurality of elements in the plurality of hash table buckets such that each hash table bucket has one of the plurality of elements; and
    adding, by a processor, a new element to the hash table wherein adding includes:
        determining, using only one hash function, a plurality of hash table indexes identifying at least some of the hash table buckets in which the new element will be inserted, wherein determining a hash table index includes:
            determining a hash function output using an input associated with the new element;
            transforming the hash function output using a transform technique to reduce a range of the hash function; and
            determining the hash table index using the transformed hash function output,
        deleting elements stored in the identified hash table buckets, and
        inserting the new element in the identified hash table buckets.

2. The method of claim 1, wherein determining the plurality of hash table indexes comprises:
    determining a first hash table index of the plurality of hash table indexes using the hash function on a key associated with the new element; and
    determining at least one additional hash table index of the plurality of hash table indexes by incrementing from the first hash table index, wherein a total count of the first hash table index and the additional hash table indexes is less than a threshold determined using a weight associated with the new element and the count of the plurality of hash table buckets.

3. The method of claim 2, wherein the additional hash table indexes are limited to include only hash table indexes associated with a hash bucket storing a current element equal to an original element stored in a hash bucket associated with the first hash table index.

4. The method of claim 1, wherein determining the plurality of hash table indexes comprises:
    determining hash table indexes associated with each of the plurality of hash table buckets to be added to the plurality of hash table indexes when no elements are stored in the plurality of hash table buckets.

5. The method of claim 1, wherein determining the plurality of hash table indexes comprises:
    initializing a counter; and
    iteratively performing the steps of:
        determining a hash table index of the plurality of hash table indexes by using the hash function on a combination of a key associated with the new element and the counter, and
        incrementing the counter;
    wherein the iterations are stopped based on a comparison between a count of the plurality of hash table indexes and a threshold determined using a weight associated with the new element and the count of the plurality of hash table buckets.

6. The method of claim 5, wherein the weight is determined using a count of the plurality of elements.

7. The method of claim 1, wherein the hash table buckets associated with the hash table indexes produced by the transformed hash function output are stored in memory and any remaining hash table buckets are not stored in memory such that each of the plurality of elements is associated with at least one hash table bucket that is stored in memory.

8. The method of claim 7, wherein a count of hash table buckets stored in memory is increased without refactoring the hash table using the steps of:
    increasing a range of the transformed hash function output, resulting in additional hash table indexes; and
    storing additional hash table buckets in memory that are associated with the additional hash table indexes, wherein the additional hash table buckets are initialized by copying elements stored in hash table buckets previously stored in memory.

9. The method of claim 1, wherein the transform technique is truncation and the hash function is a cyclic redundancy check function.

10. The method of claim 1, further comprising:
    removing one of the plurality of elements from the hash table without refactoring the hash table using the steps of:
    determining, using the hash function, a hash table index identifying a first hash table bucket in which the element to be removed is stored;
    identifying a replacement element other than the element to be removed in the hash table;
    replacing a first element stored in the first hash table bucket identified by the hash table index with the replacement element; and
    iteratively performing the steps of:
        incrementing the hash table index, and
        replacing a second element stored in a second hash table bucket identified by the incremented hash table index with the replacement element;
        wherein the iterations are stopped during an iteration where the second element is different than the element to be removed.

11. The method of claim 10, wherein identifying the replacement element comprises:
  decrementing the hash table index; and
  identifying the replacement element as the element stored in a hash table bucket identified by the decremented hash table index.

12. The method of claim 1, further comprising:
  removing one of the plurality of elements from the hash table without refactoring the hash table using the steps of:
  initializing a delete counter;
  identifying a stored count associated with the element to be removed; and
  iteratively performing the steps of:
    determining a hash table index by using the hash function on a combination of a key associated with the element to be removed and the delete counter,
    replacing an element stored in a hash table bucket identified by the hash table index with a replacement element, and
    incrementing the delete counter;
  wherein the iterations are stopped once the delete counter is greater than the stored count.

13. The method of claim 12, wherein removing one of the plurality of elements further comprises:
  identifying the replacement element based on analysis of the plurality of elements stored in the hash table and their associated weights, such that the replacement element is stored in a count of hash table buckets that is less than a target count of hash table buckets determined using the weight associated with the replacement element.

14. The method of claim 12, wherein the stored count for each of the plurality of elements is cached in the at least one memory and at least some of the stored counts are updated after an element is added or removed.

15. An article of manufacture comprising:
  at least one non-transitory computer-readable medium having stored thereon a hash table data structure;
  a plurality of hash table buckets included within the hash table data structure, wherein each hash table bucket has an associated hash table index corresponding to at least one output of a hash function, and wherein a count of the plurality of hash table buckets is greater than or equal to a maximum count of elements to be stored in the hash table data structure over a period in which the hash table data structure is used; and
  a plurality of elements stored in the plurality of hash table buckets so that each of the plurality of hash table buckets has one of the plurality of elements;
  wherein the hash table data structure is capable of storing one or more new elements in the plurality of hash table buckets without refactoring the hash table data structure, and wherein the maximum count of elements stored in each respective hash table bucket in the plurality of hash table buckets is one.

16. The article of manufacture of claim 15, wherein at least some of the plurality of elements occupy a number of hash table buckets proportionate to a weight associated with each of those elements.

17. The article of manufacture of claim 15, wherein only a portion of the plurality of hash buckets are stored on the computer-readable medium and each of the stored hash table buckets is associated with a hash table index corresponding to an transformed output of the hash function, the transformed output having a smaller range than the hash function output.

18. A method comprising:
  identifying a hash table data structure that is stored in a non-transitory memory, wherein the hash table data structure includes a plurality of hash table buckets, wherein each hash table bucket has an associated hash table index corresponding to at least one output of a hash function, and wherein a count of the plurality of hash table buckets is greater than or equal to a maximum count of elements to be stored in the hash table data structure over a period in which the hash table data structure is used; and wherein a plurality of elements are stored in the plurality of hash table buckets so that each of the plurality of hash table buckets has one of the plurality of elements, and wherein the hash table data structure is capable of storing one or more new elements in the plurality of hash table buckets without refactoring the hash table data structure, and wherein the maximum count of elements stored in each respective hash table bucket in the plurality of hash table buckets is one; and
  performing, by a processor, an operation on the hash table data structure without refactoring the hash table data structure, wherein the operation is one of add, remove, or replace.

19. The method of claim 18, wherein the operation is an add and performing the operation comprises:
  determining a plurality of hash table indexes identifying at least some of the hash table buckets in which the new value will be inserted; and
  inserting the new value in each of the identified hash table buckets.

20. The method of claim 18, wherein the operation is a remove and performing the operation comprises:
  determining, using the hash function, a hash table index identifying a first hash table bucket in which an element to be removed is stored;
  identifying a replacement element other than the element to be removed in the hash table;
  replacing a first element stored in the first hash table bucket identified by the hash table index with the replacement element; and
  iteratively performing the steps of:
    incrementing the hash table index, and
    replacing a second element stored in a second hash table bucket identified by the incremented hash table index with the replacement element;
  wherein the iterations are stopped during an iteration where the second element is different than the element to be removed.

21. The method of claim 18, wherein the operation is a remove and performing the operation comprises:
  initializing a delete counter;
  identifying a stored count associated with an element to be removed; and
  iteratively performing the steps of:
    determining a hash table index by using the hash function on a combination of a key associated with the element to be removed and the delete counter,
    replacing an element stored in a hash table bucket identified by the hash table index with a replacement element, and
    incrementing the delete counter;
  wherein the iterations are stopped once the delete counter is greater than the stored count.

22. The method of claim 18, wherein the operation is a replace and performing the operation comprises:

determining a plurality of hash table indexes identifying the hash table buckets in which an element to be replaced is stored; and inserting a replacement element in each of the identified hash table buckets by replacing the element to be replaced that is stored in the identified hash table buckets.

* * * * *